United States Patent [19]

Flynn et al.

[11] 3,844,856

[45] Oct. 29, 1974

[54] NITROCELLULOSE PROPELLANT COMPOSITION CONTAINING ALUMINUM HYDRIDE

[75] Inventors: James P. Flynn; George A. Lane; John J. Plomer, all of Midland, Mich.

[73] Assignee: The Dow Chemical Company, Midland, Mich.

[22] Filed: June 16, 1965

[21] Appl. No.: 465,251

[52] U.S. Cl.............. 149/19.8, 149/19.2, 149/76, 149/96
[51] Int. Cl............................................. C06d 5/06
[58] Field of Search............ 149/18, 19, 96, 98, 38, 149/76, 19.2, 19.8

[56] References Cited
UNITED STATES PATENTS

| | | | |
|---|---|---|---|
| 2,992,908 | 7/1961 | Hedrick et al. | 149/19 |
| 3,002,830 | 10/1961 | Barr | 149/83 X |
| 3,053,709 | 9/1962 | Herty | 149/19 |
| 3,094,444 | 6/1963 | Hedrick et al. | 149/19 |

*Primary Examiner*—Benjamin R. Padgett
*Attorney, Agent, or Firm*—C. Kenneth Bjork

[57] ABSTRACT

The present invention comprises a solid double-base propellant composition comprising on a weight basis from about 5 to about 40 percent of a crystalline substantially non-solvated aluminum hydride, from about 18 to about 39 per cent ammonium perchlorate and from about 30 to about 60 per cent of a plasticized nitrocellulose binder.

4 Claims, No Drawings

NITROCELLULOSE PROPELLANT COMPOSITION CONTAINING ALUMINUM HYDRIDE

This invention relates to propellants and more particularly is concerned with a novel solid double base propellant composition exhibiting a high specific impulse.

It is a principal object of the present invention to provide a novel high energy propellant composition exhibiting a high specific impulse.

It is another object of the present invention to provide a novel double base solid propellant composition that cures at room temperature to a rubbery elastomer without undesirable gas formation.

These and other objects and advantages readily will become apparent from the detailed description presented hereinafter.

The present invention comprises a solid double-base propellant composition containing on a weight basis from about 5 to about 40 percent of a crystalline substantially non-solvated aluminum hydride, from about 18 to about 39 percent ammonium perchlorate and from about 30 to about 60 percent of a plasticized nitrocellulose binder.

Ordinarily the composition comprises on a weight basis from about 20 to about 37 percent of the aluminum hydride, from about 18 to about 39 percent ammonium perchlorate and from about 40 to about 55 percent of a plasticized nitrocellulose binder.

A preferred embodiment of the present novel double base propellant composition consists essentially of from about 20 to about 29 weight percent non-solvated particulate, crystalline aluminum hydride, from about 20 to about 30 weight percent of ammonium perchlorate and about 50 percent of a plasticized nitrocellulose binder, said binder consisting of about 25 parts by weight plastisol grade nitrocellulose and 75 parts by weight of a mixture of from about 16 to about 53.5 weight percent diethyleneglycol dinitrate and from about 84 to about 46.5 weight percent trimethylolethane trinitrate.

Crystalline forms of non-solvated aluminum hydride particularly suitable for use in the composition of the present invention are those disclosed in copending applications Ser. No. 179,509, filed Mar. 8, 1962, and Ser. No. 234,277, filed Oct. 23, 1962.

Both finely divided and relatively large crystals (from about 5 to 300 microns) have been successfully employed in the present composition. The aluminum hydride can be used as prepared, or if desired, may be given a thin coating, e.g., $Al_2O_3$, $Al(OH)_3$ wax or acrylonitrile of about 1 percent or more on the weight of the hydride. The use of such coatings serves as a further aid to eliminate gassing in the formulation during formulation and curing.

Ordinarily the binder is a blend containing, on a weight basis, from about 1 to about 5 parts of a nitroplasticizer to 1 part of a plastisol grade nitrocellulose. Diethyleneglycol dinitrate, triethyleneglycol dinitrate, trimethylolethane trinitrate and mixtures thereof are particularly effective plasticizers.

For optimum physical stability of the present propellant grain, i.e., substantially complete elimination of gassing during formulation, curing and storage, moisture and acids should be maintained at a desirably low level in all mix ingredients. Further, all manipulative procedures during formulation, as well as the curing and storage of the final propellant grain should be carried out in an inert, substantially anhydrous atmosphere, e.g., nitrogen or argon.

The propellant is prepared by mixing and blending the particulate aluminum hydride crystals, ammonium perchlorate and plasticized nitrocellulose binder into a substantially homogeneous mixture. The mixture is cast, extruded or otherwise formed and cured at a temperature of from about room temperature, i.e., 18° to 25° C. to about 50° C. for a period of from about 10 to about 48 hours, ordinarily from about 16 to about 24 hours. The resulting propellant is a solid, elastomeric, substantially void-free grain.

The solid particulate aluminum hydride fuel and ammonium perchlorate oxidizer as employed in the present novel composition are used in a particle size range ordinarily employed for fuel-oxidizer components in solid double base propellants.

The present composition finds utility as a propellant for rockets and rocket driven missiles.

The following Examples will serve to further illustrate the present invention but are not meant to limit it thereto.

EXAMPLE 1

A number of plasticized nitrocellulose-crystalline aluminum hydride-ammonium perchlorate compositions were formed by blending together the mix components to provide a substantially homogeneous mixture. Each of the compositions was cast into a propellant grain and cured at a temperature within the range of from room temperature (i.e., about 18°–25° C.) to about 50° C. for a period of from about 10 to about 24 hours. The resulting cured products were substantially void-free, elastomeric grains having a density of from about 1.50–1.55 grams per cubic centimeter.

The heats of explosion per gram for grains from a number of compositions was determined. Table I presents the mix formulation of heats of explosion values for the compositions studied.

Table I

| Run No.) | Composition | | | | | Results | | 3 Remarks |
|---|---|---|---|---|---|---|---|---|
| | $NC^{(1)}$ | $DEGDN^{(2)}$ | $TMETN^{(3)}$ | $AlH_3$ | $AP^{(4)}$ | Number of Determinations | $AH_{e,r}$ | |
| | (weight per cent) | | | | | | cal./gram | |
| 1 | 12.5 | 20 | 17.5 | 29 | 21 | 7 | 1590±16 | formulated in air |
| 2 | 12.5 | 20 | 17.5 | 29 | 21 | 6 | 1774±10 | formulated in argon |
| 3 | 12.5 | 20 | 17.5 | 24 | 26 | 5 | 1630±13 | formulated in air |
| 4 | 12.5 | 20 | 17.5 | 24 | 26 | 7 | 1761±6 | formulated in argon |
| 5 | 12.5 | 20 | 17.5 | 20 | 30 | 8 | 1691±27 | limited exposure to air |
| 6 | 12.5 | 6 | 31.5 | 29 | 21 | 4 | 1634±7 | limited exposure to atmosphere |
| 7 | 12.5 | 6 | 31.5 | 29 | 21 | 8 | 1774±10 | no exposure to air |

(1) plastisol grade nitrocellulose
(2) diethyleneglycol dinitrate
(3) trimethylolethane trinitrate
(4) ammonium perchlorate This study showed the advantage gained by carrying out the preparation of the grain in an inert atmosphere, i.e., argon.

In a second study propellant grains prepared as set forth hereinbefore using various formulations of the present invention and the burning efficiencies measured in a ballistic bomb. Table II summarizes the results of these tests.

percent. This motor fired successfully and was smooth burning.

EXAMPLE 4

The combustion temperature and theoretical impulse values were calculated for a number of formulations of the present invention. The propellant formulation data and performance results from this study are presented in Table III.

Table III

| NC[1] Run No. | Propellant Composition | | | Results | |
|---|---|---|---|---|---|
| | TMETN[2] | AlH$_3$ | AP[3] | Comb. Temp. °K | Specific Impulse Isp (sec.) |
| | (weight per cent) | | | | |
| 1 | 12.5 | 37.5 | 32 | 18 | 3320 | 287.2 |
| 2 | 12.5 | 37.5 | 29 | 21 | 3479 | 290.6 |
| 3 | 11.25 | 33.75 | 33 | 22 | 3381 | 288.5 |
| 4 | 11.25 | 33.75 | 30 | 25 | 3524 | 291.3 |
| 5 | 10 | 30 | 35 | 25 | 3373 | 288.0 |
| 6 | 12.5 | 37.5 | 24 | 26 | 3522 | 286.5 |
| 7 | 11.25 | 33.75 | 27 | 28 | 3543 | 285.5 |
| 8 | 10 | 30 | 32 | 28 | 3520 | 291.9 |
| 9 | 8.75 | 26.25 | 36 | 29 | 3431 | 286.2 |
| 10 | 12.5 | 37.5 | 20 | 30 | 3514 | 281.9 |
| 11 | 8.75 | 26.25 | 33 | 32 | 3576 | 292.6 |
| 12 | 7.5 | 22.5 | 37 | 33 | 3485 | 290.4 |
| 13 | 8.75 | 26.25 | 30 | 35 | 2642 | 291.1 |
| 14 | 7.5 | 22.5 | 34 | 36 | 3616 | 293.3 |
| 15 | 7.5 | 22.5 | 31 | 39 | 3679 | 291.8 |

[1] plastisol grade nitrocellulose
[2] trimethylolethane trinitrate
[3] ammonium perchlorate Table II

| Run No. | Composition | | | | | Results | | | Remarks |
|---|---|---|---|---|---|---|---|---|---|
| | NC[1] | DEGDN[2] | TMETN[3] | AlH$_3$ | AP[4] | Impulse (Isp (sec.)) | | | |
| | (weight per cent) | | | | | obs. | theo. | eff.% | |
| 1 | 12.5 | 20 | 17.5 | 29 | 21 | 254 | 290.6 | 87.4 | formulated in air |
| 2 | 12.5 | 20 | 17.5 | 29 | 21 | 273 | 290.6 | 93.8 | formulated in argon |
| 3 | 12.5 | 20 | 17.5 | 24 | 26 | 237 | 286.5 | 82.7 | formulated in air |
| 4 | 12.5 | 20 | 17.5 | 24 | 26 | 267 | 286.5 | 93.3 | formulated in argon |
| 5 | 12.5 | 20 | 17.5 | 20 | 30 | 260 | 281.9 | 92.2 | limited exposure to air |
| 6 | 12.5 | 6 | 31.5 | 29 | 21 | 273 | 290.6 | 94 | no exposure to air |

[1] plastisol grade nitrocellulose
[2] diethyleneglycol dinitrate
[3] trimethylolethane trinitrate
[4] ammonium perchlorate

EXAMPLE 2

Two end-burning motors were prepared having a cured propellant grain (~46 grams) as described in Example 1 using the following formulation on a weight basis: nitrocellulose-12.5 percent diethyleneglycol dinitrate-20 percent, trimethylolethane trinitrate-17.5 percent, crystalline substantially non-solvated aluminum hydride (pressed and reground 20–100 mesh wax coated)-20 percent and ammonium perchlorate-30 percent.

Both fired successfully, the grain burning smoothly substantially to completion.

Using this same formulation, a number of ¼ pound, 2 inch by 3 inch cylindrical internal burning grain motors were fabricated and fired. In all cases, smooth-burning resulted.

EXAMPLE 3

A ¼ pound, 2 inch by 3 inch motor having internal burning grains was fabricated using the following propellant composition: (on a weight basis) nitrocellulose-12.5 percent, trimethylolethane trinitrate-31.9 percent, diethyleneglycol dinitrate 5.6 percent, particulate, crystalline, substantially non-solvated aluminum hydride-29.0 percent and ammonium perchlorate-21.0

In a manner similar to that described for the preceding Examples, solid double base propellant grains having other binders as set forth hereinbefore can be fabricated.

Various modifications can be made in the present invention without departing from the spirit or scope thereof for it is understood that we limit ourselves only as defined in the appended claims.

We claim:

1. A solid double-base propellant composition comprising on a weight basis
   a. from about 5 to about 40 percent of a crystalline substantially non-solvated aluminum hydride,
   b. from about 18 to about 39 percent ammonium perchlorate, and
   c. from about 30 to about 60 percent of a plasticized nitrocellulose binder.

2. A solid double-base propellant composition comprising on a weight basis
   a. from about 20 to about 37 percent of a crystalline substantially non-solvated aluminum hydride,
   b. from about 18 to about 39 percent ammonium perchlorate, and
   c. from about 40 to about 55 percent of a plasticized nitrocellulose binder.

3. A solid double base propellant composition consisting essentially of on a weight basis
   a. from 20 to about 29 percent of a crystalline, substantially non-solvated aluminum hydride,
   b. from about 20 to about 30 percent ammonium perchlorate, and
   c. about 50 percent of a plasticized nitrocellulose binder, said binder consisting of about 25 parts by weight plastisol grade nitrocellulose and 75 parts by weight of a mixture of from about 16 to about 53.5 weight percent diethyleneglycol dinitrate and from about 84 to about 46.5 weight percent trimethylolethane trinitrate mixture.

4. A solid double base propellant composition consisting essentially of on a weight basis
   a. about 29 percent of a crystalline, substantially non-solvated aluminum hydride,
   b. about 21 percent ammonium perchlorate, and
   c. about 50 percent of a plasticized nitrocellulose binder, said binder consisting of about 25 parts by weight plastisol grade nitrocellulose and 75 parts by weight of a mixture of 15 weight percent diethyleneglycol dinitrate-85 weight percent trimethylolethane trinitrate.

* * * * *